United States Patent [19]

Belke et al.

[11] 4,030,816

[45] June 21, 1977

[54] VARIABLE FOCUS RIGHT ANGLE MIRROR FOR LASER BEAM MANIPULATION

[75] Inventors: William H. Belke; Joseph C. Hafele, both of Peoria, Ill.

[73] Assignee: Caterpillar Tractor Co., Peoria, Ill.

[22] Filed: Apr. 22, 1976

[21] Appl. No.: 679,420

[52] U.S. Cl. .................................. 350/294; 350/293
[51] Int. Cl.² .......................................... G02B 5/10
[58] Field of Search ............ 350/294, 293, 200, 55; 219/121 L

[56] References Cited
UNITED STATES PATENTS 3,907,408  9/1975  Engel .................................. 350/294

Primary Examiner—John K. Corbin
Assistant Examiner—Jon W. Henry
Attorney, Agent, or Firm—Phillips, Moore, Weissenberger, Lempio & Majestic

[57] ABSTRACT

A reflective mirror system for controlling the supply beam of a laser is provided. The system includes a first mirror having the surface of a partial section of the surface of a paraboloid of revolution and mounted in a housing relative to a collimated beam such as produced by a laser, so as to reflect the beam from the direction of travel on to a second mirror. From the second mirror the beam is reflected through an opening in the first mirror and converged to a point of focus for doing useful work on a workpiece.

4 Claims, 3 Drawing Figures

VARIABLE FOCUS RIGHT ANGLE MIRROR FOR LASER BEAM MANIPULATION

BACKGROUND OF THE INVENTION

This invention relates to lasers, and in particular to a mirror system for controlling a laser beam such as a collimated annular beam.

Practical commercial usage of lasers in commercial applications is in large measure dependent upon developing economic and dependable laser beam sources of sufficient power, and suitable peripheral equipment in the form of optical systems to focus and control the laser beam. Optical systems for focusing and controlling laser beams have been developed which use mirrors for focusing and controlling the beam. One such system uses an axially symmetric Cassegranian telescope for this purpose. With this axially symmetric system, the laser beam from a source which is typically in the form of a collimated annular beam enters the rear of a tubular telescope housing through an opening in a forwardly facing concave mirror and impinges on a centrally disposed rearwardly facing convex mirror. The beam is reflected back to the concave mirror, where it is reflected forwardly and out of the housing to a point of focus. Unfortunately, this type of system has disadvantages in requiring support structure for mounting the convex mirror which interferes with the laser beam.

In an attempt to at least partially avoid this problem, improved right angle Cassegranian systems have been developed such as shown in U.S. Pat. No. 3,907,408 to Engel, assigned to the assignee hereof. With this right angle Cassegranian system the intersecting support struts are eliminated. However, this right angle system requires three mirrors. Since the mirrors absorb power of the laser beam, this is disadvantageous over the axially symmetric Cassegranian telescope which requires only two mirrors. The additional mirror also adds to the complexity of the system since it requires extra mounting structure and extra cooling structure to take away heat generated in the mirrors.

To solve these and other problems, mirrors have been proposed which use complex shapes such as parabolic shapes. The present invention provides a variable focus off axis parabolic mirror system, as will be hereinafter described.

SUMMARY AND OBJECTS OF THE INVENTION

It is therefore the primary object of this invention to provide a mirror system for controlling a beam and which provides a relatively obstruction free path for the beam.

It is a further object to provide such a system which requires fewer mirrors than is the case with other systems and is thus less costly and more efficient in terms of unwanted energy loss.

It is a still further object to provide such a system which uses only two mirrors, has no obstructions therebetween, and wherein the mirrors are capable of being relatively adjusted.

The invention comprises a mirror system for controlling a beam of corpuscular energy, such as a supply laser beam. The mirror system includes a housing having an opening therein, and a first mirror having the surface of a partial paraboloid of revolution. The mirror thus described is mounted to receive a beam and direct it substantially 90° to impinge on a convex mirror offset from the axis of the paraboloid mirror. The beam is reflected from the convex mirror, through an opening in the paraboloid mirror and out of the housing to a point of focus.

BRIEF DESCRIPTION OF THE DRAWINGS

Further and other objects and advantages of this invention will become more readily apparent from a review of the following specification and drawings in which.

Detailed Description

Figure 1:
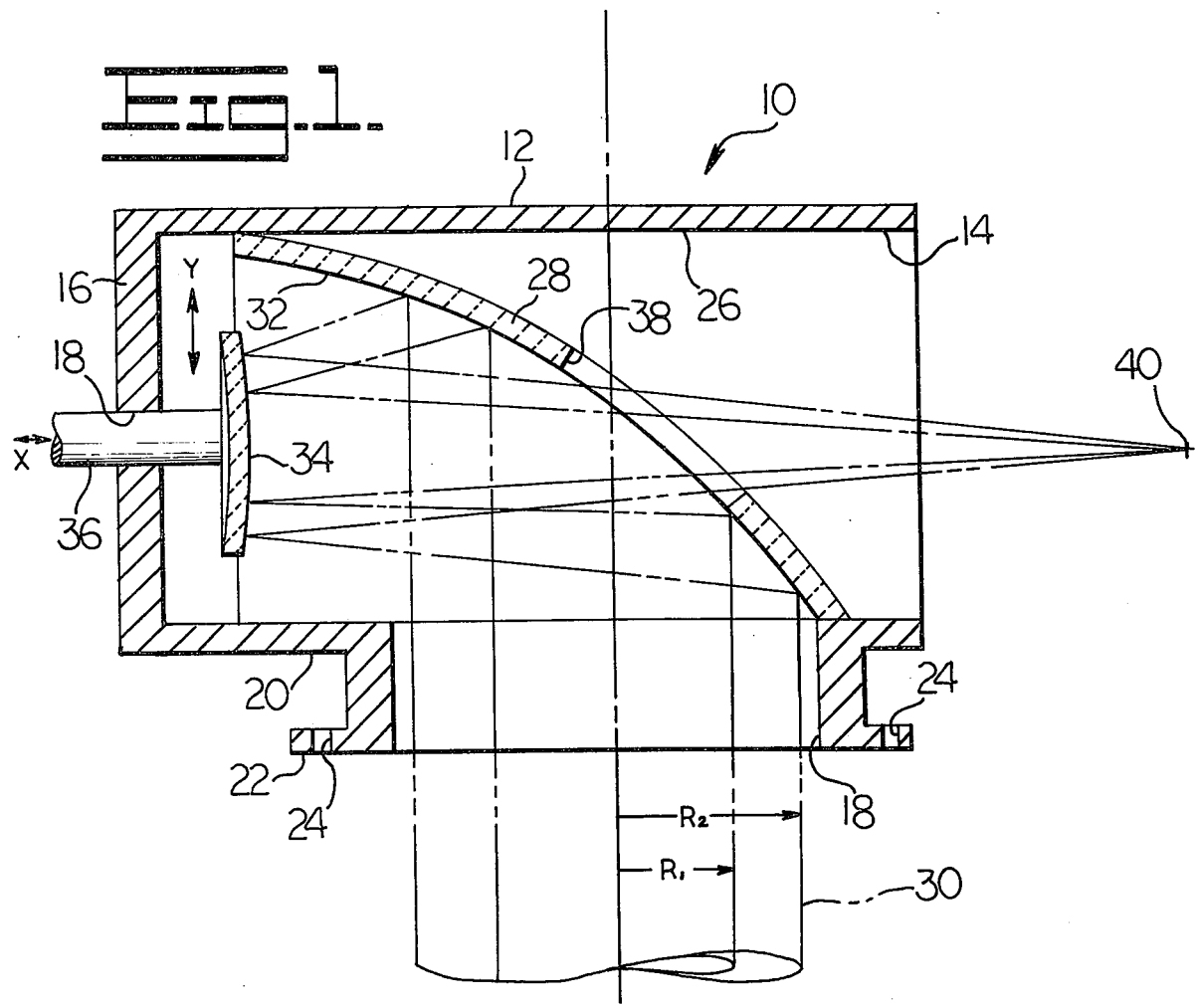
FIG. 1 is a sectional elevational view of the mirror system of this invention.

FIG. 1 shows a sectional elevation view of the inventive mirror system shown generally at 10. The mirror system includes a tubular housing 12 having a circular open end 14 and an end wall 16 closing the end opposite to the open end. A circular opening 18 is formed in the cylindrical side wall 20 of housing 12 and includes an annular mounting flange 22 having a plurality of spaced mounting holes 24 therearound for the obvious purpose.

Mounted within the bore 26 of housing 12 is a first mirror for reflecting a laser beam, such as collimated laser beam 30. As seen in this figure and in FIG. 3, the laser beam is typically in collimated, annular form defining an inner radius $R_1$ and outer radius $R_2$.

Figure 2:
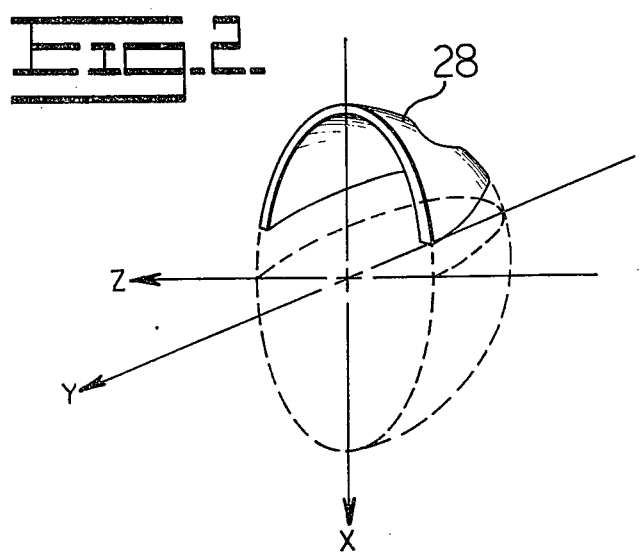
FIG. 2 is a schematic perspective view of the paraboloid mirror illustrating the geometric shape thereof in relation to its X,Y,Z axes; and, FIG. 3 is a schematic illustration in the X − Z plane of the mirror system of FIG. 1.

Turning to FIG. 2, the shape of the first mirror is shown to be in the form of a partial section of a paraboloid of revolution. Returning to FIG. 1, it may be appreciated that the beam impinging on the reflective inner surface 32 of mirror 28 is reflected substantially 90° toward the rear of housing 12 where it impinges on a second, convex mirror 34. Alternatively, this second mirror could be either plane, convex or concave, depending upon the desired point of focus. If convex or concave, it could be in the shape of a hyperboloidal section. Both of the mirrors may be made of suitable material such as silvered glass or copper. The second mirror is movably mounted in an "X" axial direction by a suitable means such as elongated rod 36 slidably fitted within bore 18. The second mirror is also movable in the "Y" and "Z" direction by being movably attached to the rod end such as by use of fasteners.

The beam is reflected from second mirror 34 in the "X" axial direction and passes through an opening 38 in the first mirror 28 to a point of focus 40 outside of the housing. The thus converged and concentrated beam is available to do useful work on, for example, a workpiece (not shown).

Figure 3:
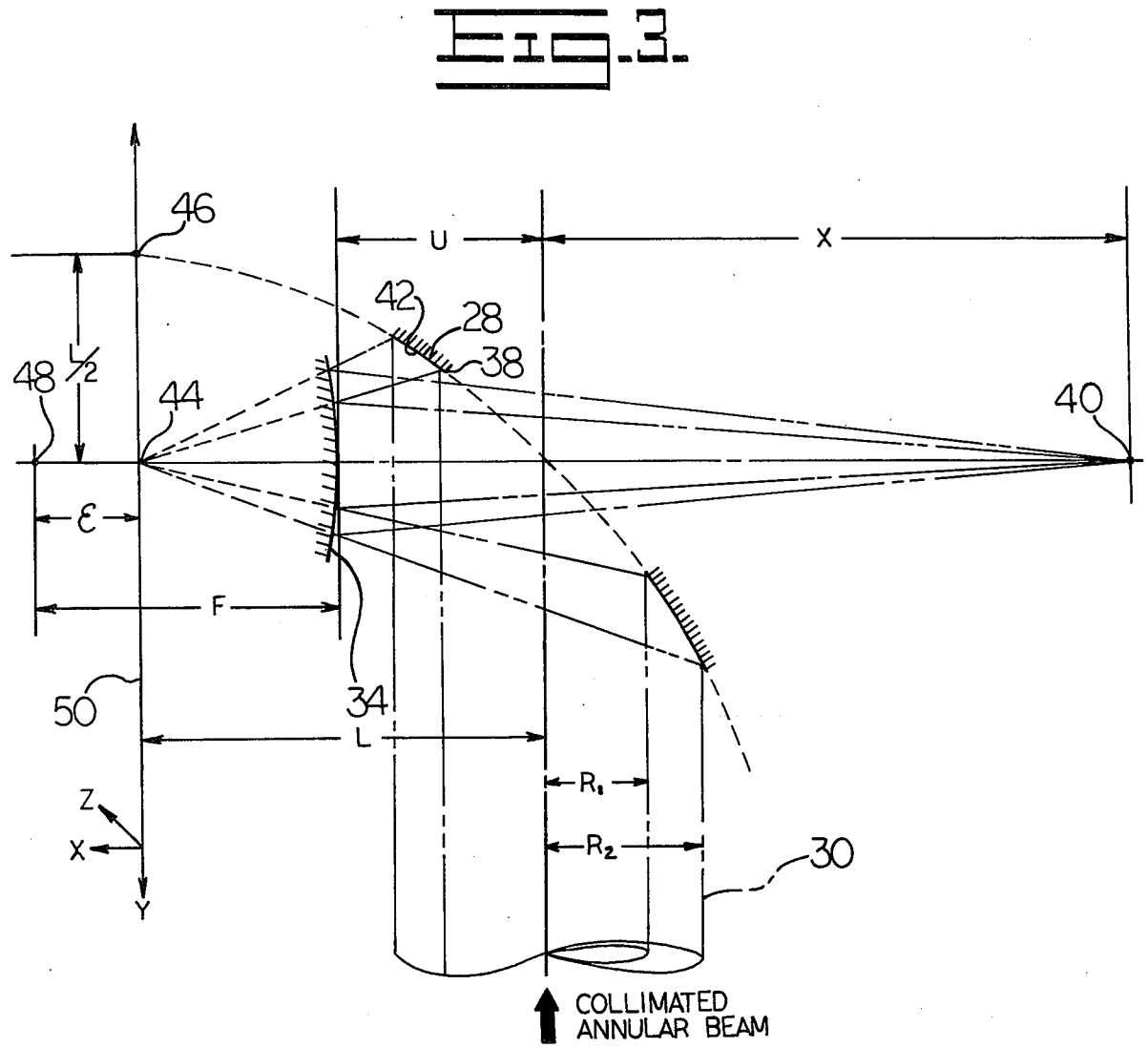

Turning to FIG. 3, the following mathematical analysis of the mirror system is to be made. The paraboloid mirror 28 defines a paraboloid surface 42, parabolic focus 44, and a parabolic vertex 46. The focal point of the second, movable mirror is shown at 48 and the parabolic axis at 50. In the following discussion:

L = semi-latus rectum of the parabolic surface

U = distance from the incident beam axis to the face of the movable mirror

X = distance from the incident beam axis to the deflected beam focal point

F = focal length of movable mirror (equal to one-half of the radius of curvature for a spherical mirror)

$\epsilon = F + U - L$ = distance between focal points

The axial position and the axial and lateral deflection of the point of beam focus are respectively given by the following three formulas:

$$X = (F^2/\epsilon) - \epsilon - L$$
$$(dX/d\epsilon) = -[(F^2/\epsilon^2) - 1]$$
$$(dY/dY') = -2[F/\epsilon - 1]$$

The most convenient way to define the parabolic surface is to give the (semi) latus rectum, the distance L on the diagram of FIG. 3. The equation that defines the parabolic surface is:

$$x^2 = 2 L y,$$

where the origin is at the vertex, $y$ is the coordinate along the parabolic axis, and $x$ is the coordinate perpendicular to the parabolic axis. It is easy to show that the distance from the vertex to the parabolic focus is L/2.

Application of the thin lens formula to the movable mirror, assumed to be a convex spherical mirror, gives:

$$1/(X+U) = 1/L - U - 1/F$$

Solving for X gives:

$$X = \frac{F(L-U)}{F-L+U} - U$$

and substitution for $\epsilon$ gives:

$$X = \frac{F^2}{\epsilon} - \epsilon - L$$

An axial displacement of the movable mirror causes a corresponding axial displacement in the beam focus, which is given by:

$$\frac{dX}{d\epsilon} = -\left[\frac{F^2}{\epsilon^2} - 1\right]$$

The optical boundary conditions determine that:
$\epsilon > 0$, (for the image to be real) which means $$F + U > L.$$

Also, the image must be formed outside the system, so $$X > R_2$$

This requires $$\epsilon < \frac{R_2 + L}{2}\left[\left(1 + \left(\frac{2F}{R_2 + L}\right)^2\right)^{\frac{1}{2}} - 1\right]$$

Some such criterion is sensible because, as the movable mirror moves out (U and $\epsilon$ increase), the beam focus moves in (X decreases), and there is a point beyond which the beam focus goes inside the system (X becomes less than $R_2$).

There is a clearance condition such that the outer rays reflected from the movable mirror can freely pass through the hole in the parabolic mirror. This condition is most severe with the movable mirror moved in as far as possible, that is, with $\epsilon=0$. In this case the beam focus is far away ($X=\infty$) and the emerging beam is parallel. It is possible with these circumstances to calculate a minimum value for U. A little algebra gives:

$$U > R_2\left[1 + \left(\frac{L}{R_2} - 1\right)\left(1 - \frac{R_1}{R_2} \frac{2L - R_1}{2L - R_2}\right)\right]$$

A lateral displacement of Y of the beam focus will result from a lateral displacement Y' of the center of curvature of the movable mirror. Such a result could be obtained by a lateral displacement of the entire movable mirror. The "lateral magnification" is given by:

$$\frac{dY}{dY'} = -2\frac{(X+U)}{F}$$

Substitution for X and $\epsilon$ gives:

$$\frac{dY}{dY'} = -2\frac{(F-\epsilon)}{\epsilon}$$

It would be easy to get relatively large axial and lateral magnifications by making:

$$\epsilon << F.$$

As an illustrative example of performing a calculation with the above formulas, suppose $R_1 = 1''$, $R_2 = 2''$ and $L = 6''$. The minimum value for U is:

$$U_{min} = 1 + (3-1)\left(1 - \frac{1}{2}\frac{12-1}{12-2}\right) = 1.9''$$

At this value for U, $\epsilon=0$, so $$F = L - U = 4.1''$$

The maximum value for the $\epsilon$ becomes:

$$\epsilon_{max} = \frac{2+6}{2}\left[\left(1 + \left(\frac{2 \times 4.1}{2+6}\right)^2\right)^{\frac{1}{2}} - 1\right]$$
$$= 1.7''$$

at which point $X = R_2 = 2''$.
If $\epsilon = 0.1F = 0.41''$,
$X = 34.6''$
$(dX/d\epsilon) = -99$
$dY/dy, = -18$ Other cases can be easily calculated from the above formulas.

It is to be understood that the foregoing description is merely illustrative of the preferred embodiment of the invention and that the scope of the invention is not to be limited thereto, but is to be determined by the scope of the appended claims.

What is claimed is:

1. A mirror system for controlling a supply laser beam comprising a housing, an opening in said housing, a first mirror having the surface of a partial paraboloid of revolution, said first mirror having a reflective parabolic surface and being positioned to reflect the supply laser beam passing through said opening substantially 90° from the direction of travel of the supply laser beam, said first mirror having an opening disposed therein, and a second mirror disposed rearwardly of said first mirror and positioned to reflect the laser beam reflected from said first mirror through said opening in said first mirror, means for supporting said second mirror relative to said housing, said second mirror having a reflective surface positioned to reflect the laser beam reflected from the reflective surface of said first mirror forwardly through said opening in said first mirror to a point of focus.

2. The system of claim 1 wherein said point of focus is located outside said housing.

3. The system of claim 2 wherein said means supporting said second mirror comprises means for providing relative movement of said second mirror with respect to said first mirror.

4. The system of claim 1 wherein said second mirror has a convex reflective surface.

* * * * *